United States Patent [19]
Barber

[11] 3,885,002
[45] May 20, 1975

[54] MANUFACTURE OF TRIALKYLTRITHIOPHOSPHITES AND TRIALKYLPHOSPHOROTHIOATES

[75] Inventor: F. Taylor Barber, Bartlesville, Okla.

[73] Assignee: Phillips Petroleum Company, Bartlesville, Okla.

[22] Filed: Apr. 30, 1973

[21] Appl. No.: 355,614

[52] U.S. Cl. .............................................. 260/972
[51] Int. Cl. ............................................. C07f 9/16
[58] Field of Search .................................... 260/972

[56] References Cited
UNITED STATES PATENTS
3,178,468  4/1965  Clark ................................ 260/972

Primary Examiner—Lorraine A. Weinberger
Assistant Examiner—Richard L. Raymond

[57] ABSTRACT

The manufacture of trialkyltrithiophosphites by reacting an excess of an alkyl mercaptan with phosphorous trihalide and scrubbing of noncondensible reactor off-gases with strong caustic solution, continuing the scrubbing until the strong caustic solution becomes spent though still mildly alkaline when the alkyl mercaptan separates into a separate phase. The mercaptans are separated to recycle. The trialkyltrithiophosphite can be oxidized to trialkyltriphosphorothioate with further stripping and recovery of remaining mercaptans.

9 Claims, 1 Drawing Figure

MANUFACTURE OF TRIALKYLTRITHIOPSPHITES AND TRIALKYLPHOSPHOROTHIOATES

FIELD OF THE INVENTION

The invention relates to a process for the preparation of trialkyltrithiophosphites. In another aspect, the invention relates to the preparation of trialkylphosphorothioate.

BACKGROUND OF THE INVENTION

Trialkyltrithiophosphites are prepared by the reaction of an alkyl mercaptan with a phosphorous trihalide. If the trialkylphosphorothioate is desired, the trialkyltrithiophosphite from the initial reaction is subjected to an oxidation step such as with molecular oxygen, to produce the desired trialkylphosphorothioate. The initial step results in the production of off-gases containing alkyl mercaptan and hydrogen halide. The second step, usually conducted in the presence of additional or excess alkyl mercaptan, also results in off-gases containing alkyl mercaptan. Such gases represent annoying and expensive waste disposal problems. Not only are the off-gases from the first or both stages presenting serious disposal problems, as well as the subsequent washing and purification steps for the product, but disposal to the atmosphere is objectionable because of the odor problem involved. Loss of the mercaptan constitutes expensive chemical cost. Conventional neutralization with aqueous alkali results in a dilute alkaline solution containing high quantities of mercaptan or mercaptide, itself difficult to satisfactorily dispose of in view of present environmental restrictions. Heretofore the net result has been large quantities of highly contaminated alkaline effluent difficult to dispose of, and representing wasteful quantities of alkyl mercaptan or mercaptide.

BRIEF SUMMARY OF THE INVENTION

I have discovered that the off-gases of n-alkyl mercaptan and hydrogen halide from the first reaction step can be taken up by a strong caustic solution, which will absorb both the mercaptan and the hydrogen halide, neutralizing the hydrogen halide, and that this take-up can be continued until the pH of the caustic solution drops down to the range of about 8 to 12 representing little remaining caustic, and in this area the n-alkyl mercaptan virtually completely separates as a disparate phase, and can be readily recovered by decanting or skimming or the like and recycled.

Where the reaction scheme includes a second stage oxidation to the trialkylphosphorothioate, the off-gases in this stage also can be conducted to a caustic absorber for recovery of excess n-alkyl mercaptan. Either or both products, of course, are subjected to purification which also may result in off-gases containing n-alkyl mercaptan which can be absorbed in a caustic absorber, whose liquor can be combined with the liquor from the first absorber. Spent or exhausted caustic contains essentially water, sodium halide, remaining minor amount of caustic, and only very small traces of alkyl mercaptan which can be readily stripped or otherwise readily handled for disposal purposes.

DETAILED DESCRIPTION OF THE INVENTION
PREPARATION OF TRIALKYLTRITHIOPHOSPHITE

A phosphorous trihalide which is phosphorous trichloride, phosphorous tribromide, or phosphorous triiodide, preferably the trichloride, is reacted with an alkyl mercaptan of three, four, or five carbon atoms per molecule, or mixture of two or more of these, preferably n-butyl mercaptan, to provide high yields of trialkyltrithiophosphite $(RS)_3P$ where R is an alkyl of 3 to 5 carbon atoms, by employing the mercaptan in a considerable excess over the stoichiometric quantity required in the reaction which theoretically requires one mole of potassium trihalide to three moles of alkyl mercaptan. Preferably, I use at least a slight excess of mercaptan per mole of phosphorous trihalide, such as from above stoichiometric to an excess of about 10 weight per cent over the stoichiometric requirement. This tends to avoid or minimize formation of mono- and di-alkyl phosphites. Larger quantities can be employed, though this represents a considerable excess which then ultimately must be separated. Lesser usage decreases the yield of trialkyl product.

The alkyl mercaptan is added to the reaction zone preferably under anhydrous conditions considering the nature of the other reactant phosphorous trihalide. Then the phosphorous trihalide is added with mixing. The temperature of the reactants is raised to permit the reaction to proceed, such as to about 125° to 135° F., and reaction temperature normally is maintained at about 125° to 250° F., preferably 135° to 240° F. Lower temperatures result in formation of partially alkylated products, and the higher temperatures assist in driving off hydrogen halide. Temperatures above 240° F. can be utilized, so long as temperatures high enough to degrade the product are avoided. The reaction may be conducted under pressure if desired, though this is not necessarily desirable, and reaction at generally atmospheric or slightly elevated pressure is convenient. Subatmospheric pressure can be employed, if desired, to assist in removal of hydrogen halide as formed.

PREPARATION OF TRIALKYLPHOSPHOROTHIOATE

Where it is desired to produce trialkylphosphorothioate (trialkyltrithiophosphate)$(RS)_3P=O$, the product admixture of alkylphosphites from the first reaction then is treated, normally in the presence of some excess alkyl mercaptan, with molecular oxygen under conditions of temperature and pressure sufficient to effectuate oxidation of the trithiophosphite to the trithiophosphate (phosphorothioate). This is an exothermic reaction. Temperatures are controlled at about the same range and for reasons similar as described for the first reaction. Pressures expediently can be maintained at elevated levels for speedier reactions, such as 15–20 psig or higher. The reaction can be conducted in the first reacton zone, though for convenience, separate reactors can be used.

The product mixture can be purified, such as by water-washing, followed by drying, packaging, as may be suitable or convenient.

DESCRIPTION OF THE DRAWING

My invention may be further described with reference to the attached FIG. 1. The reaction scheme and my recovery and recycle scheme of alkyl mercaptan are described in terms of n-butyl mercaptan and are shown as a two-stage production of tributylphosphorothioate. However, this should not be considered limitative of the proper scope of my invention, merely illustrative of the reactions, recovery, and recycle of alkyl mercaptan.

Briefly, the drawing shows the feed of n-butyl mercaptan and of phosphorous trichloride to a first reaction zone. Hydrogen chloride off-gases with some n-butyl mercaptan are conducted to a separation zone. The tributyltrithiophosphite produced in the first reaction zone is treated with molecular oxygen and preferably in presence of excess n-butyl mercaptan in a second reaction zone to produce tributylphosphorothioate. Off-gases from this second reaction are conducted to the separation zone. The tributylphosphorothioates so produced are purified. Alkyl mercaptan recovered from the purification zone also can be conducted to the separation zone. Of course, it would be possible to conduct the reactions sequentially in a single reaction zone, if desired.

DETAILED DESCRIPTION OF THE DRAWING

Figure 1:
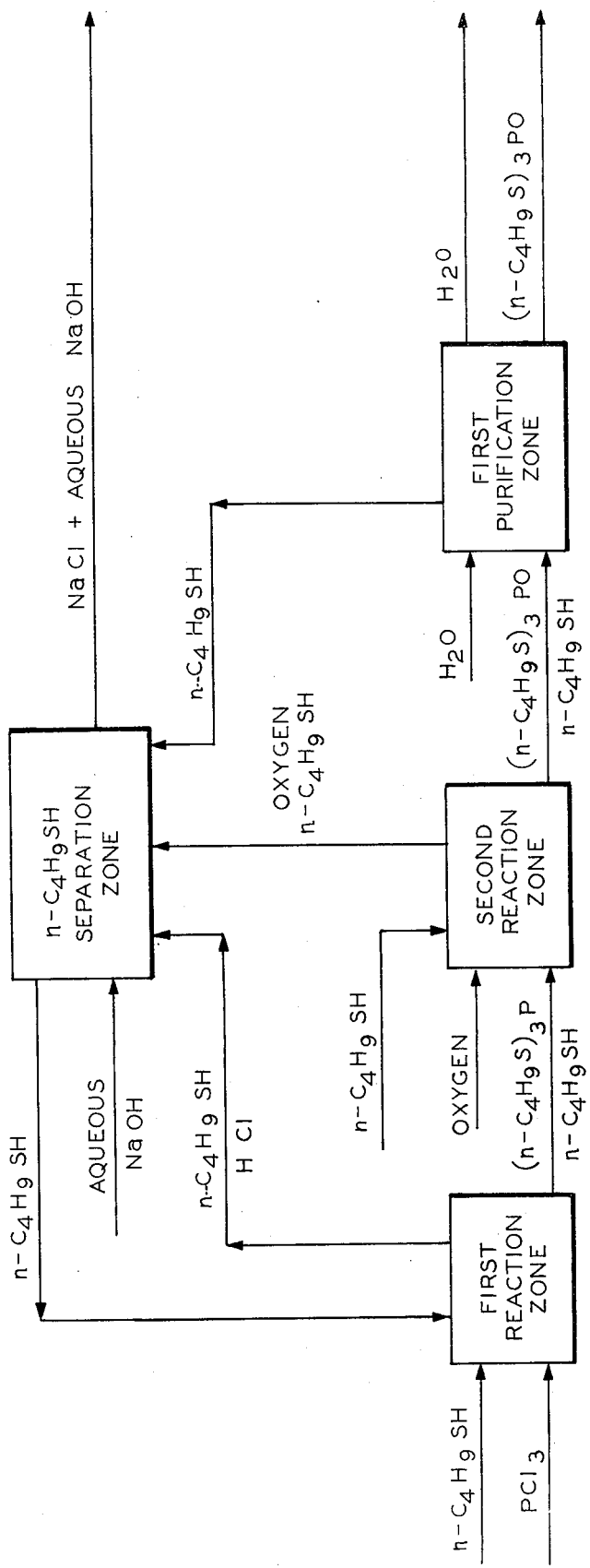

N-butyl mercaptan is charged to the first reaction zone in an amount in excess of the anticipated stoichiometric requirements. The temperature is elevated to such as about 125° F., the contents agitated, and the phosphorous trichloride addition commenced and continued until the desired amount of phosphorous trichloride has been added. The reaction can be conducted at any convenient temperature sufficient to maintain the reaction. The reaction temperature should be sufficiently high to assist in driving off the hydrogen chloride produced by the reaction, which then can be conveniently removed as overhead vapor.

The off-vapors contain chiefly hydrogen chloride with some minor amounts of unconsumed n-butyl mercaptan, and are shown in the drawing being taken as overhead from the first reaction zone to an n-butyl mercaptan separation zone.

It is feasible and practical to operate the first reaction zone with a reflux means, such as a condenser, preferably cooled, to return some of the n-butyl mercaptan from this overhead off-gas back to the first reaction zone, thus reducing load on the separation zone.

After completion of the reaction, the product mixture is recovered if the tributyltrithiophosphite product is desired, or is subjected to oxidation if the tributyltrithiophosphate is desired.

The reaction product mixture from the first reaction, primarily tri-n-tributyltrithiophosphite containing residual amounts of HCl, some n-butyl mercaptan, and some small amounts of monoalkyl and dialkylphosphites, then can be subjected to oxidation. This oxidation can be conducted in a separate reaction zone, or it can be conducted in the first reaction zone, if desired. Oxidation converts the tri-n-butyltrithiophosphite to the tri-n-butylphosphorotrithioate (trithiophosphate). Since some monoalkyl and dialkyl components are present, n-butyl mercaptan also preferably is present during this second reaction for the purpose of reacting with any such residual partially alkylated materials as well as with any traces of phosphorous trichloride which may be contained within the tributyltrithiophite reaction product mixture charged to the tributylphosphorothioate reaction zone. The n-butyl mercaptan can be obtained from excess in the first reaction, or additional can be added to the second reaction. Molecular oxygen is employed as the oxidizing agent, in the form of molecular oxygen as such, or more conveniently in the form of air. The reaction can be conducted at temperature and pressures as before described.

Off-gas from the oxidation reaction will contain n-butyl mercaptan, oxygen, and other gases if air is used as the oxidant. This off-gas stream contains valuable n-butyl mercaptan which is desirable to recover and not to discharge to the atmosphere or to other waste disposal.

Off-gas from the oxidation reaction also may include traces of hydrogen chloride by reaction of n-butyl mercaptan with any remaining phosphorous trichloride or partially alkylated phosphorous chlorides in the reactants. Again, it is desirable not to discharge the acidic gas to the atmosphere. Therefore, the off-gases from the oxidation reaction also can be conducted to the n-butyl mercaptan separation zone.

SEPARATION ZONE

The n-butyl mercaptan separation zone contains a strong caustic, and can be operated as a batch separation zone, or a continuous separation zone if desired. Separate scrubbers to scrub off-gases from each reaction are particularly convenient, followed by a phase separation zone.

The strong caustic exemplarily can contain caustic soda at any convenient strength up to saturated caustic solution at the temperature employed, preferably 5 to 40 weight per cent, more preferably about 20 weight per cent. The off-gases to be absorbed are at elevated temperatures, and hence add heat to the caustic. Therefore, cooling may be desirable, either of the gases or the caustic. Exemplary absorption temperatures would be about 100° to 200° F., preferably 100° to 160° F. The strong caustic absorbs the hydrogen chloride and n-alkyl mercaptan from one or more trialkyltrithiophosphite batches, until the pH of the strong caustic drops down to the area of less than about 10, such as about 8 to 10, at which stage the n-alkyl mercaptan becomes substantially insoluble, and can be recovered such as by skimming or decanting, and recovered and recycled.

The n-alkyl mercaptan scrubbers can be operated on a continuous basis, with aqueous caustic solution being added intermittantly or continuously, such as in general proportion according to the amount of hydrogen chloride and n-alkyl mercaptan to be absorbed. The n-alkyl mercaptan is substantially insoluble at a liquor pH less than about 10, and separates into a separate phase and can be recovered as desired, periodically or continuously, by phase separation for recycle.

The liquor or absorbent employed which I have described as strong caustic can be any relatively strongly alkaline material particularly a Group IA metal hydroxide, lithium, sodium, potassium, rubidium, or cesium, or mixture, though certainly sodium hydroxide represents low relative cost. Other alkaline materials also can be employed, such as the strong alkali carbonates, though cost would be higher, and their use is considered equivalent to caustic soda or other alkali metal hydroxide.

My term "caustic" is used broadly to refer to and include any of the broad classes I have described.

It is feasible to operate as a batch operation with a strong up to saturated caustic solution and simply absorb hydrogen chloride containing off-gas until the caustic content of the solution is depleted as indicated by drop in pH. Under strong caustic solutions the alkyl mercaptans tend to be solubilized as the mercaptide. As the pH drops, by continued absorption of hydrogen chloride, the n-butyl mercaptide converts to n-butyl mercaptan, which is substantially insoluble in solutions at a pH of less than about 10.

The absorbed n-butyl mercaptide which is soluble in relatively strongly alkaline solutions becomes insoluble in this relatively mildly alkaline solution, converting to n-butyl mercaptan, separates as an upper oil phase quite separate and distinct from the aqueous phase, and can be separated by decantation or the like and recycled as needed in the reaction. Separation can be any conventional mechanical phase separator, skimmers, or the like, as may be convenient. The n-butyl mercaptan can be recycled to the first reaction, or to the second reaction, or both.

The separation and recovery of the n-butyl mercaptan not only recovers considerable quantities of useful material, but leaves in a mildly alkaline solution with little residual or retained mercaptide or mercaptan, much more suitable for waste disposal. As long as the pH is above 7, preferably 8, corrosion is minimal. By suitable separation is meant a separation of at least 90 weight per cent of n-butyl mercaptan relative to the total quantity of mercaptan absorbed.

The aqueous wash solution containing minor amounts of mercaptan, sodium chloride, remaining traces of caustic, then are sent to waste disposal by the usual means, such as ponding, neutralization with any available acid stream, or the like.

Conveniently, the n-butyl mercaptan separation zone can be operated with separate caustic scrubbers or absorbers for each reaction zone. When this modification of my process is employed, the scrubber for the off-gases from the first reaction conveniently is operated at a relatively low pressure such as 2-5 psig for effective absorption of HCl, since these off-gases contain a relatively large proportion of HCl compared to n-butyl mercaptan. The second absorber used in conjunction with the second reaction handles off-gases containing only small amounts of HCl compared to n-butyl mercaptan. The spent liquor from the first scrubber and that from the second scrubber can be taken individually or together as suitable to a phase separation zone for recovery of n-butyl mercaptan as hereinbefore described.

PRODUCT PURIFICATION

If the oxidation reaction is not conducted, then the impure tributyltrithiophosphite can be purified such as by water washing. Or, if the oxidation reaction is conducted, then the impure tributylphosphorothioate can be purified such as by water washing. This water washing can be conducted in the same reaction zone as was utilized for conduction of the chemical reactions, though it is preferred to keep the purification zone separate because of the employment of water and need to avoid uncontrolled amounts of moisture where phosphorous trihalide is employed.

Purification can be carried out such as by washing the impure trithiophosphite product mixture or the impure trithiophosphite product mixture with water. Washing with water at elevated temperature is preferable, since conveniently this maintains the product as the upper phase. Temperatures such as in the area of about 210°–240° F. can be employed, for a period of time sufficient for the degree of purification desired. Some n-butyl mercaptan tends to accompany the impure product, and this together with water vapor can be passed overhead from the purification zone, and, if desired, and preferably, also passed for treatment to the n-butyl mercaptan separation zone.

Purified tributyltrithiophosphite, or purified tributylphosphorothioate, then can be separated as a product from the water phase, which water phase may contain residual acidic contaminants. The wash water phase can be stored and recycled, or can be utilized in water disposal, such as by admixing with dilute waste caustic soda solution from the n-butyl mercaptan separation zone to provide a partially self-neutralizing waste disposal scheme, if desired.

In accordance with the practice of this invention, discharge of n-alkyl mercaptan, or n-alkyl mercaptide, to the environment as waste by-product by vaporous discharge is avoided, and that sent to waste treatment is greatly reduced, being a relatively minor amount remaining in the dilute caustic.

As will be apparent to those skilled in the art, reasonable variations and modifications of the invention are possible within the scope of this disclosure without departing from the spirit and scope thereof.

I claim:

1. A process for the preparation of trialkyltrithiophosphites which comprises the steps of:
   reacting under reaction conditions at least one phosphorous trihalide with at least one alkyl mercaptan of 3 to 5 carbon atoms per molecule, thereby producing a first product mixture comprising trialkyltrithiophosphite, and a first off-gas stream comprising hydrogen halide and alkyl mercaptan, wherein said reaction conditions include a temperature in the range of about 125° to 250°F.,
   contacting said first off-gas stream with a first strong aqueous caustic solution, thereby substantially absorbing said hydrogen halide and said alkyl mercaptan from said off-gas,
   continuing said contacting and absorbing, thereby reducing the pH of said strong caustic containing absorbed alkyl mercaptan to below about 10, whereby said absorbed alkyl mercaptan substantially separates as an alkyl mercaptan phase from said aqueous phase, and
   recycling said separated alkyl mercaptan to said reacting step.

2. A process for preparing trialkyltrithiophosphates which comprises the process of claim 1, followed by contacting said first product mixture comprising trialkyltrithiophosphite with molecular oxygen-containing gases under oxidation conversion conditions including a reaction temperature in the range of about 125° to 250°F., thereby producing a second reaction mixture comprising trialkyltrithiophosphate and a second off-gas containing alkyl mercaptan,
   contacting said second off-gas with a further strong aqueous caustic solution, thereby substantially absorbing said alkyl mercaptan, wherein said further strong aqueous caustic can be the same or separate from said first strong aqueous caustic, continuing said contacting and absorbing thereby reducing the pH of said further caustic solution containing absorbed alkyl mercaptan to below about 10, whereby said absorbed alkyl mercaptan substantially separates as a separate phase, separating said alkyl mercaptan phase and recycling to the trialkylphosphite reaction, or to said oxidation reaction, or both.

3. A process according to claim 1 wherein said phosphorous trihalide is phosphorous trichloride, phosphorous tribromide, or phosphorous triiodide; and said caustic is an alkali metal hydroxide and is lithium hydroxide, sodium hydroxide, potassium hydroxide, cesium hydroxide, or rubidium hydroxide.

4. A process according to claim 3 wherein said alkyl mercaptan is an n-alkyl mercaptan and is employed in an excess over stoichiometric amount required for reaction with said phosphorous trihalide.

5. The process according to claim 4 wherein said reaction of said alkyl mercaptan with said phosphorous trihalide is conducted at a temperature in the range of about 135° to 240° F., and said oxidation reaction is conducted at a temperature in the range of about 135° to 240° F.

6. The process according to claim 5 wherein said alkyl mercaptan is n-butyl mercaptan, said phosphorous trihalide is phosphorous trichloride, said trialkylphosphite is tri-n-butyltrithiophosphite, and said trialkylphosphorothioate is tri-n-butylphosphorothioate.

7. The process according to claim 2 wherein each said off-gas stream is subjected to scrubbing with a separate aqueous strong caustic scrubbing solution, the spent liquor from each is combined for phase separation, and the reduction in pH is accomplished by absorption of hydrogen halide from either or both said off-gas streams.

8. The process according to claim 2 wherein said trialkylphosphorothioate product mixture is water washed at elevated temperatures, the vapor therefrom forming a third off-gas stream containing alkyl mercaptan, and said third off-gas stream containing alkyl mercaptan is treated for recovery of said alkyl mercaptan contained therein.

9. The process according to claim 1 wherein said trialkyltrithiophosphite product mixture is water washed at elevated temperatures, the vapor therefrom forming a second off-gas stream containing alkyl mercaptan, and said second off-gas stream containing alkyl mercaptan is treated for recovery of said alkyl mercaptan contained therein.

* * * * *